Figure 1:
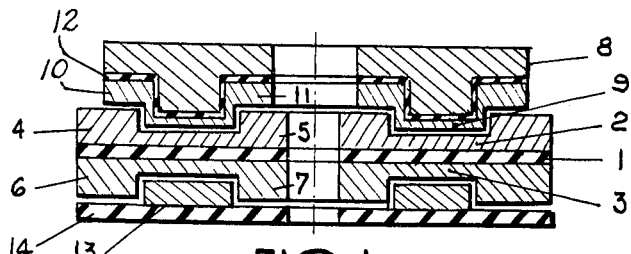

Dec. 28, 1965     J. HENRY-BAUDOT     3,226,586

AXIAL AIRGAP ROTARY MACHINES

Filed Jan. 21, 1960

Inventor:
Jacques Henry-Baudot
By Kenyon, Palmer and Stewart

United States Patent Office 3,226,586
Patented Dec. 28, 1965

3,226,586
AXIAL AIRGAP ROTARY MACHINES
Jacques Henry-Baudot, Antony, France, assignor to
Printed Motors Inc., New York, N.Y.
Filed Jan. 21, 1960, Ser. No. 3,768
Claims priority, application France, Feb. 5, 1959,
786,046, Patent 1,226,508
3 Claims. (Cl. 310—254)

The present invention concerns improvements in or relating to axial airgap rotary machines of the kind wherein at least one electrical winding is made of flat conductors intimately secured to an annular insulated surface, either on a single face or on the two opposite faces thereof, said winding or windings supported by the rotor and/or the stator of the machine being inserted within the annular airgap between magnetic disk-like shaped members of the structure.

It is obviously of advantage to provide such an airgap as narrow as feasible and consequently, it would be of advantage to have these flat conductors as thin as feasible but a drawback then appears: a reduced thickness of the conductors increases the electrical resistance of the winding and consequently increases the ohmic losses in the machine. This results in contradictory conditions for the efficiency of the machine and it is an object of the invention to substantially eliminate this contradiction and consequently enables the provision of machines having a narrow airgap and thin conductors in their active portions.

According to one feature of the invention, the conductors of such windings comprise active central portions arranged on both faces of an insulating plate and interconnected by inactive head-spool portions (hereinafter called end portions). Consequently it is not imperative that the end portions be located within the magnetic airgap of the machine.

According to another feature of the invention, the end portions of the winding conductors are thickened with respect to the active parts of said conductors and these thickened portions are arranged not to impede the formation of a very narrow airgap between the active portions of the conductors and the facing surface of the other member in the machine which is opposite to the winding carrying member: either these thickened parts are outside this airgap or they are orientated in the winding in the direction opposite to that facing the said airgap; if required, the winding carrier may be provided of a shape accommodating such thickened parts of the winding.

Axial airgap rotary machines may include such a winding either as part of their rotor or part of their stator, or else, both the stator and rotor may each include such kind of winding whether of similar or different patterns.

Figure 2:
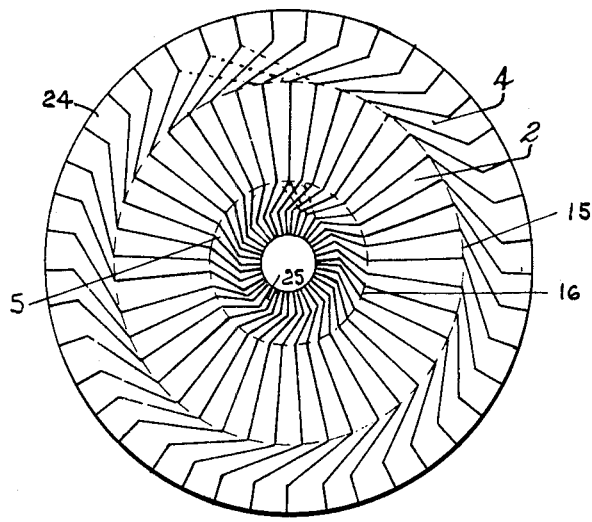
Figure 3:
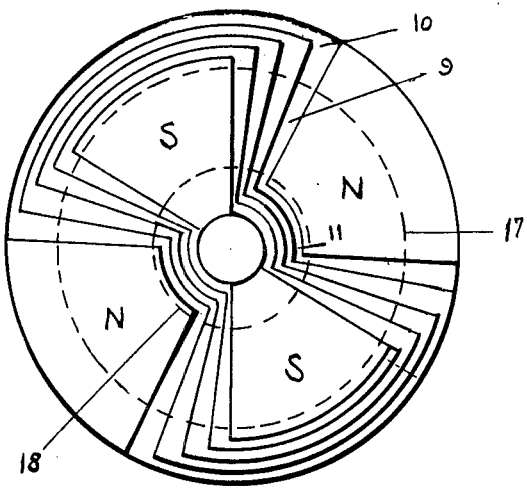

In order to simplify the explanation of this invention, an illustrative embodiment will be considered relating to a machine having a stator winding and a rotor winding both in accordance with the invention and consequently all features of windings according to the invention are readable on this embodiment, though use of all of them is not simultaneously imperative. Such embodiment is shown in the accompanying drawings, wherein:

FIG. 1 is a cross-section view of the machine;
FIG. 2 is a front view of a face of the rotor winding in this machine;
FIG. 3 is a front view of the face of the stator winding of this machine.

In the drawing, some structural and assembly details of the machine are not shown, since they are unnecessary for an understanding of the invention. The axial airgap machine includes three members: a rotor constituted by a flat conductor winding according to the invention made on an insulating disc 1; an inductor member comprising for instance a magnetic annular member 8 over which is applied a stator winding 9 with the intermediary of an insulating sheet 12, said stator winding being also formed of flat conductors intimately secured to said sheet 12; and a magnetic yoke 13 supported for instance by a plate 14.

The outer diameters of the fixed members are made slightly smaller than the diameter 15 which, in the rotor winding, see FIG. 2, delineates the outer ends of the active portions 2 of the rotor conductors, i.e. the radial and sectorial portions of the conductors (2 on the face shown in FIGS. 2 and 3 on the opposite face, see FIG. 1 in this respect). Similarly the inner diameters of the fixed members are made slightly larger than the diameter 16 which in the rotor winding delineates the inner end of the active portions 2 and 3 of the rotor winding conductors 2 and 3. In an illustrative fashion, the rotor winding is shown with 41 conductors on each face for a four pole machine, the pattern being of the series wave kind. This pattern and winding are in agreement with those disclosed in my co-pending application Serial No. 1,128, now Patent No. 3,144,574, filed Jan. 7, 1960, which is a continuation-in-part of Ser. No. 691,434, now Patent No. 3,090,880, filed Oct. 21, 1957. It is to be understood that the face opposite to the one shown in FIG. 2 is similar to the former one but for opposite orientations of the end portions 4–5 and 6–7 from one face to the other one. The end portion conductors are shown ended by terminals such as 24 and 25 and it must be understood that these terminals are connected by face-to-face connections, not shown, through the insulating ring 1.

In the stator winding, defining one of the airgap surfaces, the active parts 9 of the conductors are ended by thickened parts 10 and 11 constituting the headspool parts of the winding. The magnetic member 8 is shaped to accommodate such thickened parts. It is quite apparent from FIG. 1 that the airgap may be quite narrow and the thickening of parts of the windings, as said, ensures a maintenance of reduced ohmic losses in the one and the other windings. Illustratively, the stator winding pattern is shown in FIG. 3 as being formed in successive spirals of sectorial turns supported on the surface to form groups of radial and sectorial portions 9, comprising the active portions in the operation of the machine, and groups of arcuate portions interconnecting the radial ones. The dashed line 17 indicates the outer ends of the active conductors 9. The dashed line 18 indicates the inner ends of the active conductors 9.

When the rotor structure does not include a winding of the above-described kind, but, for instance a mere squirrel-cage, flat surface in the airgap, the thickened portions 10 and 11 of the stator winding, can be made either in accordance with the pattern of FIG. 2 or of FIG. 3 or any pattern derived therefrom. The face of this stator winding may be made completely flat and the thickened portions 10 and 11 accommodated only in the magnetic member 8.

Each winding of a machine, made in accordance with the invention may be printed and in the so-called "printing" techniques, several methods are known for obtaining "prints" of varied thicknesses.

I claim:
1. An axial airgap dynamo-electric machine comprising: a pair of disc-shaped stator members positioned parallel to each other to define an axial airgap therebetween, each of said stator members including on their opposing faces raised annular portions concentric with their axis and located substantially midway of their center and peripheral portions so that the airgap between said members is wider at the center and peripheral portions compared with the airgap between said annular portions; and a disc-shaped rotor positioned in said airgap having conductors which are substantially thicker at their inner and outer radial ends to substantially fill said airgap.

2. A machine as defined by claim 1 having stator windings having inner and outer radial ends substantially thicker than the intermediate portions, said intermediate portions overlying said annular portions of said stators and lying opposite the corresponding portions of the rotor windings.

3. A machine as defined by claim 1 in which the stator members are formed of magnetic material; electrical windings applied to at least one of said stator members within said airgap and insulated from said member.

References Cited by the Examiner
UNITED STATES PATENTS

| | | | |
|---|---|---|---|
| 376,307 | 1/1888 | Jehl | 310—268 |
| 534,953 | 2/1895 | Eickemeyer | 310—268 |
| 1,789,128 | 1/1931 | Apple | 310—201 |
| 2,734,140 | 2/1956 | Parker | 310—268 |

ORIS L. RADER, *Primary Examiner.*

MILTON O. HIRSHFIELD, *Examiner.*